US009053073B1

(12) United States Patent
Subramanian et al.

(10) Patent No.: US 9,053,073 B1
(45) Date of Patent: Jun. 9, 2015

(54) USE OF TIMESTAMP LOGIC IN SYNCHRONOUS REPLICATION

(75) Inventors: Srikumar Subramanian, Newark, CA (US); Raja Jayaraman, Fremont, CA (US); Jomy Maliakal, Newark, CA (US); Paresh Chatterjee, Fremont, CA (US); Udita Chatterjee, legal representative, Kolkatta (IN)

(73) Assignee: American Megatrends, Inc., Norcross, GA (US)

( * ) Notice: Subject to any disclaimer, the term of this patent is extended or adjusted under 35 U.S.C. 154(b) by 278 days.

(21) Appl. No.: 13/449,567

(22) Filed: Apr. 18, 2012

Related U.S. Application Data

(60) Provisional application No. 61/476,724, filed on Apr. 18, 2011.

(51) Int. Cl.
*G06F 11/00* (2006.01)
*G06F 11/20* (2006.01)

(52) U.S. Cl.
CPC .................................. *G06F 11/2082* (2013.01)

(58) Field of Classification Search
CPC ............ G06F 11/1088; G06F 11/1092; G06F 11/2082; G06F 11/2056
USPC ................... 714/16, 6.2, 6.22, 6.23, 6.3, 6.32
See application file for complete search history.

(56) References Cited

U.S. PATENT DOCUMENTS

| | | | |
|---|---|---|---|
| 6,199,074 B1 * | 3/2001 | Kern et al. ............................ 1/1 |
| 6,260,124 B1 * | 7/2001 | Crockett et al. ............... 711/162 |
| 6,658,527 B1 * | 12/2003 | Hiroyasu ....................... 711/112 |
| 6,820,180 B2 * | 11/2004 | McBrearty et al. ........... 711/162 |
| 6,978,396 B2 * | 12/2005 | Ruuth et al. ..................... 714/6.3 |
| 7,120,824 B2 * | 10/2006 | Burton et al. ................. 714/6.23 |
| 7,178,055 B2 * | 2/2007 | Ji et al. ............................ 714/6.3 |
| 7,246,258 B2 * | 7/2007 | Chen et al. ...................... 714/6.3 |
| 7,908,514 B2 * | 3/2011 | Thiel et al. ....................... 714/15 |
| 7,975,173 B2 * | 7/2011 | Callaway et al. ............... 714/11 |
| 2007/0067584 A1 * | 3/2007 | Muto ............................. 711/162 |

* cited by examiner

*Primary Examiner* — Philip Guyton
(74) *Attorney, Agent, or Firm* — Meunier Carlin & Curfman, LLC (57) ABSTRACT

Systems and methods for maintaining data consistency across mirrored storage nodes. Data consistency may be maintained in networked storage environments using a timestamp of an I/O in the primary and secondary servers (also referred to as nodes) in synchronous replication to re-synchronize the data efficiently, without much performance drop and while reducing the memory footprint. According to an aspect presented herein, data consistency is maintained in a mirror node by timestamping the I/O for a volume's logical territory in both the primary and secondary nodes. The timestamp acts as a watermark. Thus, whenever a disaster or failure occurs, the watermark point determines the re-synchronization point.

20 Claims, 6 Drawing Sheets

USE OF TIMESTAMP LOGIC IN SYNCHRONOUS REPLICATION

CROSS-REFERENCE TO RELATED APPLICATION

The present application is a non-provisional of U.S. Provisional Patent Application No. 61/476,724, filed Apr. 18, 2011, entitled "USE OF TIMESTAMP LOGIC IN SYNCHRONOUS REPLICATION," which is incorporated herein by reference in its entirety.

BACKGROUND

A virtualized cluster is a cluster of different storage nodes that together expose a single storage device. Input/output operations ("I/Os") sent to the cluster are internally re-routed to read and write data to the appropriate locations. In this regard, a virtualized cluster of storage nodes can be considered analogous to a collection of disks in a Redundant Array of Inexpensive Disks ("RAID") configuration, since a virtualized cluster hides the internal details of the cluster's operation from initiators and presents a unified device instead.

In a virtualized cluster, data may also be mirrored between nodes such that copies of the data are stored in two or more locations. In a mirrored system, the data may still be available at a second node should a first node become unavailable because of hardware failure, network congestion, link failure, or otherwise. In a mirrored system, the data on each node is duplicated to other storage units. Duplication can be made at the same time as an initial write I/O or it can be done later, in a background operation. When the duplication is done at the same time as an initial write, it is called a synchronous duplication. Synchronous replication is a form of inline replication. Every I/O to the primary server is replicated to the secondary server in-line before the application server is acknowledged. In contrast, a later duplication performed in the background may be called an asynchronous duplication. In either synchronous or asynchronous mirroring systems, one of the main requirements of operation is to maintain the consistency of data across all of the mirror nodes. This results in predictable data retrieval irrespective of the mirrored storage node from which the data is accessed.

Data can be written to a storage node by issuing an I/O request to the node. The I/O request is issued by an initiator. The initiator may be another node, a computer, an application on a computer, or a user of a computer. When data is written to a storage node, that node may be referred to as a primary node. The primary node may then mirror the data to one or more other nodes that can be referred to as secondary nodes. It is an important operational requirement that data between mirrored nodes be consistent. Because all of the data writes at each respective one of the mirrored volumes may not be instantaneous, or atomic, data inconsistencies may occur due to any one of various pathological scenarios.

One pathological scenario occurs when the primary node stores new data and then attempts to mirror the data to a secondary node, but the attempt fails. This failure may be due to a network link failure, a hardware failure at the secondary, or other factors. Another pathological scenario occurs when the primary node stores data and then mirrors the data to a secondary node but the secondary system suffers a power failure before or during the write of the new data to disk. In all of these scenarios, and other mirroring failure scenarios, the nodes may eventually come back on line with inconsistent data on mirrored nodes. This is undesirable since an initiator may now retrieve different data depending upon which mirrored node the request is issued.

A drive cache is generally data stored in memory that duplicates data stored on the associated disk drive. Since memory is typically much faster than a drive, the drive data is slow to fetch relative to the speed of reading the cache. In other words, a cache is a temporary, fast storage area where data can be stored for rapid access. Once data is stored in a cache, future use can be made by accessing the cache instead of accessing the slower drive data. In a write-through cache system, every write is written to both the cache and the drive. In contrast, a write-back cache system stores every write into the cache but may not immediately store the write into the drive. Instead, the write-back cache system tracks which cache memory locations have been modified by marking those cache entries as "dirty". The data in the dirty cache locations are written back to the drive when triggered at a later time. Writing back of the dirty cache entries upon such a trigger is referred to as "flushing the cache" or "flushing the cache to disk". Example triggers to flush the cache include eviction of the cache entry, shutting down the drive, or periodic cache flushing timers. A write-back cache system is also referred to as a write-behind cache system.

Additional complications to the pathological scenarios described above occur when a write-back cache is used in a primary storage node and/or a secondary storage node. For example, both a primary storage node and a secondary storage node may have received the same data to be mirrored, but the data is cached and has not yet been flushed to disk when one of the nodes suffers a power failure. In this instance, one of the data write I/Os was received but not made persistent on the disk drive. Thus, the data will be inconsistent between the two storage nodes after the power failure completes.

In such cases, resynchronization is needed to bring back the replication solution to an optimal state. A known solution of resynchronization uses write intent logging known as gating. Gating tracks every I/O that could cause a difference. Though gating solves some issues with respect to link failures and write-back cache phenomena in primary and secondary nodes due to abrupt power failures, gating adds the additional overhead of maintaining gate tables and bitmaps in the primary and secondary nodes and persisting these bitmaps across reboot. Moreover, tracking and persisting every block which receives an I/O and serializing this operation prior to the actual I/Os add write latency for application server I/O's.

It is with respect to these considerations and others that the disclosure made herein is presented.

SUMMARY

Technologies are described herein for maintaining data consistency across mirrored storage nodes. Through the utilization of the technologies and concepts presented herein, data consistency may be maintained in networked storage environments using a timestamp of an I/O in the primary and secondary servers (also referred to as nodes) in synchronous replication to re-synchronize the data efficiently, without much performance drop and while reducing the memory footprint.

According to an aspect presented herein, data consistency is maintained in a mirror node by timestamping the I/O for a volume's logical territory in both the primary and secondary nodes. The timestamp acts as a watermark. Thus, whenever a disaster or failure occurs, the watermark point determines the re-synchronization point. It should be noted that primary and secondary nodes should be synchronized with same time zone.

According to another aspect, timestamping logical territories for the I/O is based on the most recent access time which acts as a watermark point for re-synchronization.

According to another aspect, the timestamp is maintained by a distributed volume manager based on a time segment number, which gets incremented on a fixed time interval. Determination of the fixed time interval to increment the time segment number may take into consideration factors such as flushing write-back data in various levels of cache and time lag between the replication servers.

According to other aspects, the re-synchronization point after a failure in replication is determined based on one less than the watermark point so that data consistency is maintained considering the write-back cache issues, and the re-synchronization is ordered so that territories with lesser time segment numbers are re-synced before the territories with the higher time segment numbers so that less data needs to be re-synced, if replication fails again during the re-sync process.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the invention. Furthermore, the invention is not limited to implementations that solve any or all disadvantages noted in any part of this disclosure.

BRIEF DESCRIPTION OF THE DRAWINGS

FIG. 4b is an exemplary operational flow of the re-synchronization of FIG. 4a.

DETAILED DESCRIPTION

The following detailed description is directed to technologies for maintaining data consistency across mirrored storage nodes. Through the use of the embodiments presented herein, data consistency may be maintained in networked storage environments using a timestamp of an I/O in the primary and secondary servers (also referred to as nodes) of a distributed storage system in synchronous replication to re-synchronize the data efficiently. As described further herein, the timestamp acts as a watermark. When a failure occurs, the watermark point may be used to determine the re-synchronization point.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the figures, aspects of a computing system and methodology for mirrored storage data consistency using timestamps will be described.

Figure 1:
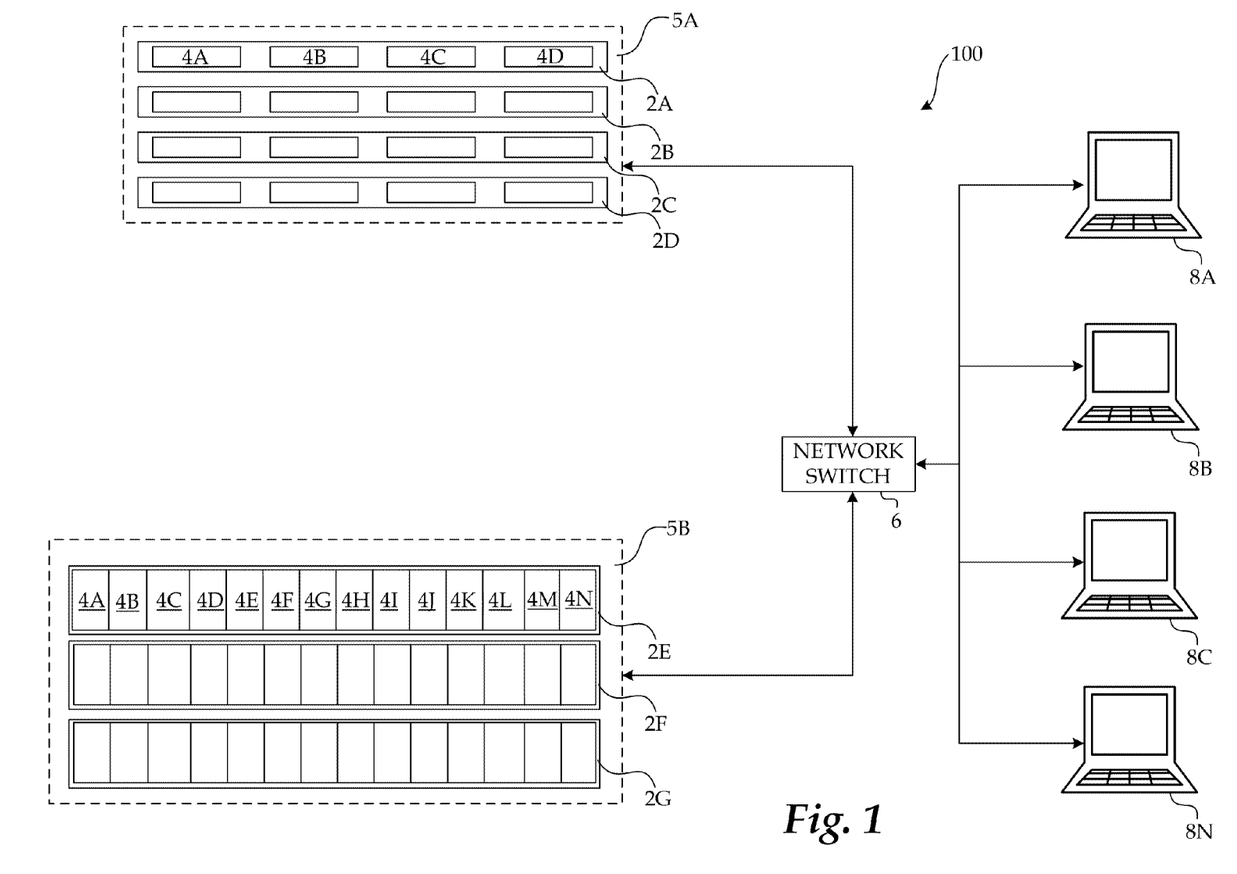
FIG. 1 is a network architecture diagram illustrating aspects of a storage system that includes several virtualized clusters according to one exemplary embodiment.

Turning now to FIG. 1, details will be provided regarding an illustrative operating environment for the implementations presented herein, as well as aspects of several software components that provide the functionality described herein for mirrored storage data consistency using timestamping. In particular, FIG. 1 is a network architecture diagram showing aspects of a storage system 100 that includes several virtualized clusters 5A-5B. A virtualized cluster is a cluster of different storage nodes that together expose a single storage device. In the example storage system 100 shown in FIG. 1, the clusters 5A-5B include the storage server computers 2A-2G (also referred to herein as "storage nodes" or a "node") that are operative to read and write data to one or more mass storage devices, such as hard disk drives. The cluster 5A includes the nodes 2A-2D and the cluster 5B includes the nodes 2E-2G. All of the nodes 2 in a cluster 5 can be physically housed in the same rack, located in the same building, or distributed over geographically diverse locations, such as various buildings, cities, or countries.

According to implementations, the nodes within a cluster may be housed in a one rack space unit storing up to four hard disk drives. For instance, the node 2A is a one rack space computing system that includes four hard disk drives 4A-4D. Alternatively, each node may be housed in a three rack space unit storing up to fifteen hard disk drives. For instance, the node 2E includes fourteen hard disk drives 4A-4N. Other types of enclosures may also be utilized that occupy more or fewer rack units and that store fewer or more hard disk drives. In this regard, it should be appreciated that the type of storage enclosure and number of hard disk drives utilized is not generally significant to the implementation of the embodiments described herein. Any type of storage enclosure and virtually any number of hard disk devices or other types of mass storage devices may be utilized.

As shown in FIG. 1, multiple storage nodes may be configured together as a virtualized storage cluster. For instance, the nodes 2A-2D have been configured as a storage cluster 5A and the nodes 2E-2G have been configured as a storage cluster 5B. In this configuration, each of the storage nodes 2A-2G is utilized to field I/O operations independently, but are exposed to the initiator of the I/O operation as a single device. It should be appreciated that a storage cluster may include any number of storage nodes. A virtualized cluster in which each node contains an independent processing unit, and in which each node can field I/Os independently (and route them according to the cluster layout) is called a horizontally virtualized or peer cluster. A cluster in which each node provides storage but the processing and mapping is done completely or primarily in a single node, is called a vertically virtualized cluster.

Data may be striped across the nodes of each storage cluster. For instance, the cluster 5A may stripe data across the storage nodes 2A, 2B, 2C, and 2D. The cluster 5B may similarly stripe data across the storage nodes 2E, 2F, and 2G. Striping data across nodes generally ensures that different I/O operations are fielded by different nodes, thereby utilizing all of the nodes simultaneously, and that the same I/O operation is not split between multiple nodes. Striping the data in this manner provides a boost to random I/O performance without decreasing sequential I/O performance.

According to embodiments, each storage server computer 2A-2G includes one or more network ports operatively connected to a network switch 6 using appropriate network cabling. It should be appreciated that, according to embodiments of the invention, Ethernet or Gigabit Ethernet may be utilized. However, it should also be appreciated that other types of suitable physical connections may be utilized to form a network of which each storage server computer 2A-2G is a part. Through the use of the network ports and other appropriate network cabling and equipment, each node within a cluster is communicatively connected to the other nodes within the cluster. Many different types and number of connections may be made between the nodes of each cluster. Furthermore, each of the storage server computers 2A-2G need not be connected to the same switch 6. The storage server computers 2A-2G can be interconnected by any type of network or communication links, such as a LAN, a WAN, a MAN, a fiber ring, a fiber star, wireless, optical, satellite, or any other network technology, topology, protocol, or combination thereof.

Each cluster 5A-5B is also connected to a network switch 6. The network switch 6 is connected to one or more client computers 8A-8N (also referred to herein as "initiators"). It should be appreciated that other types of networking topologies may be utilized to interconnect the clients and the clusters 5A-5B. It should also be appreciated that the initiators 8A-8N may be connected to the same local area network ("LAN") as the clusters 5A-5B or may be connected to the clusters 5A-5B via a distributed wide area network ("WAN"), such as the Internet. An appropriate protocol, such as the Internet Small Computer Systems Interface ("iSCSI") protocol may be utilized to enable the initiators 8A-8D to communicate with and utilize the various functions of the storage clusters 5A-5B over a wide area network such as the Internet.

Two or more disks 4 within each cluster 5A-5B or across clusters 5A-5B may be mirrored for data redundancy and protection against failure of one or more of the disks 4. Examples of the disks 4 may include hard drives, spinning disks, stationary media, non-volatile memories, or optically scanned media; each, or in combination, employing magnetic, capacitive, optical, semiconductor, electrical, quantum, dynamic, static, or any other data storage technology. The disks 4 may use IDE, ATA, SATA, PATA, SCSI, USB, PCI, Firewire, or any other bus, link, connection, protocol, network, controller, or combination thereof for I/O transfers.

Figure 2:
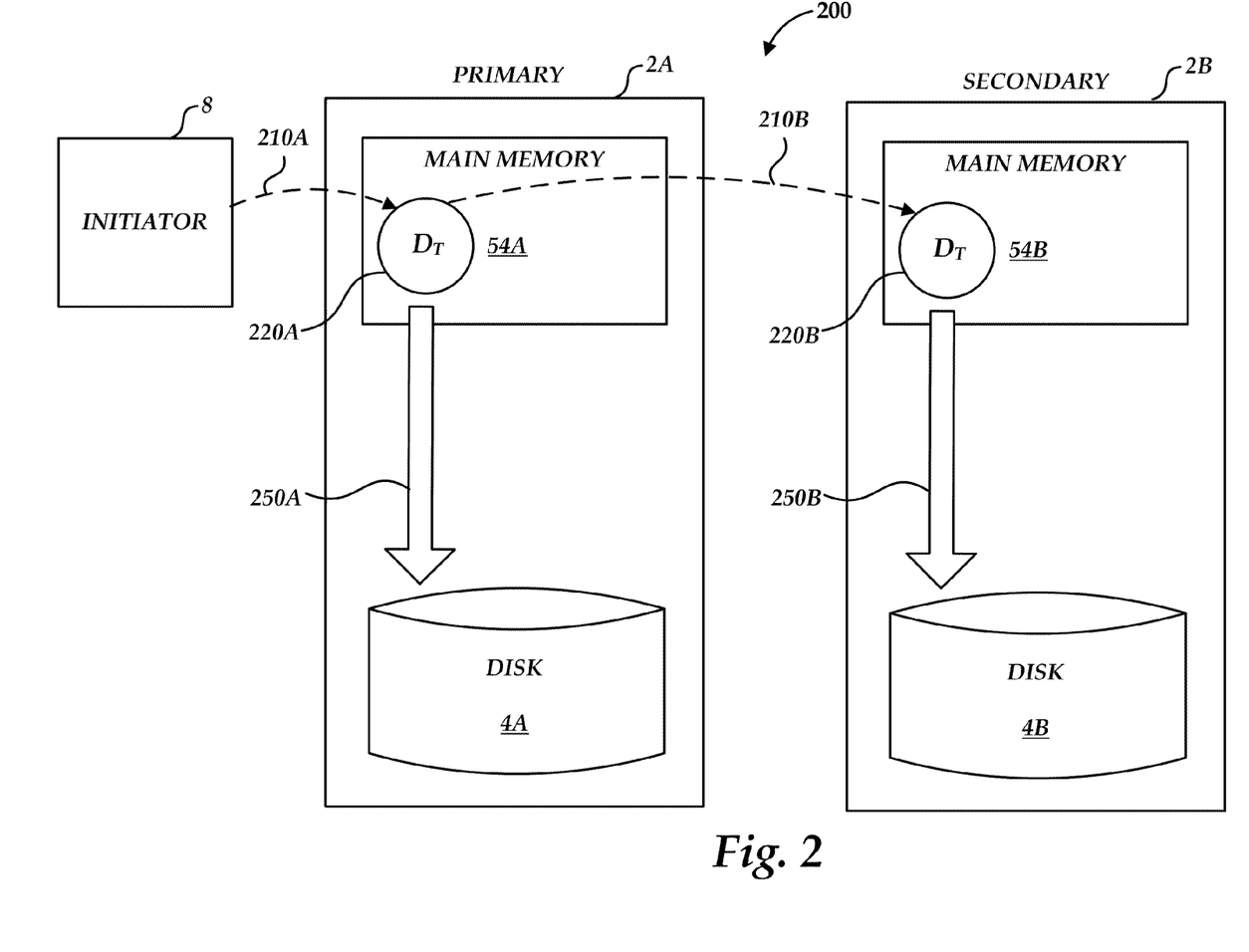
FIG. 2 is a functional architecture diagram illustrating a mirrored storage system where storage nodes employ timestamps according to one exemplary embodiment.

Referring now to FIG. 2, a mirrored storage system 200 is illustrated where the storage nodes 2A-2B employ timestamping according to one exemplary embodiment. A data I/O 210A from an initiator 8 is issued to a primary storage node 2A. The primary storage node 2A is mirrored with a secondary storage node 2B. A synchronizing I/O 210B can be relayed to the secondary storage node 2B from the primary storage node 2A in order to establish and maintain data mirroring. The synchronizing I/O 210B may be identical in payload to the original data I/O 210A. The data I/O 210A can request, as one I/O example, the storage of data $D_T$ 220A within the storage system 200. Upon initial receipt at the primary storage node 2A, the I/O 210A, including its associated data $D_T$ 220A may be located within the main memory 54A of the primary storage node 2A.

While FIG. 2 illustrates an exemplary embodiment with two mirrored storage nodes 2A-2B, the storage system 200 may also mirror data between any number of storage nodes. Also, the identification of one node as a primary storage node 2A and another node as a secondary storage node 2B may be arbitrary. The initiator 8 may process a data I/O 210A with any of the nodes in a mirrored set making that node the primary node 2A in that instance. That primary node 2A may then issue synchronizing I/O requests 210B with the other nodes in the mirrored set.

A write 250A to a mass storage device can ensure the persistence of the write intent across a failure. The mass storage device within the primary storage node 2A may include, as one example, a hard disk 4A.

The actual performance of the I/O 210A can include, in this data I/O example, the writing 250A of data $D_T$ 220A onto disk 4A. Upon arrival at the secondary storage node 2B, the synchronizing I/O 210B, including its associated data $D_T$ 220B may be located within the main memory 54B of the secondary storage node 2B. The mass storage may include, as one example, a hard disk 4B. The actual performance of the synchronizing I/O 210B can include, in this data I/O example, the writing 250B of data $D_T$ 220B onto disk 4B.

Considering a first pathological condition of a power failure at a secondary storage node 2B, the primary storage node 2A may have successfully performed the data I/O 210A while a power failure may occur at the secondary storage node 2B. The power failure may occur after the secondary storage node 2B receives the synchronizing I/O 210B but before the secondary storage node 2B writes 250B the data $D_T$ 220B to disk 4B. Such a scenario can leave the distributed storage system 200 in a state of inconsistent data where the disk 4A of the primary storage node 2A contains data $D_T$ 220B but the disk 4B at the secondary storage node 2B contains data $D_{T-1}$ since the writing 250B of data $D_T$ 220B did not complete at the secondary storage node 2B due to the power failure. Here, data $D_{T-1}$ denotes the previous state of a data record (or file, sector, stripe, block, etc.) prior to the updating of the stored data to $D_T$ by the data I/O 210A-210B. This pathological condition of power failure at the secondary storage node 2B may be mitigated using timestamping as described further herein.

Considering a second pathological condition of power failure at the primary storage node 2A, the primary storage node 2A may issue a synchronizing I/O 210B to the secondary storage node 2B where the I/O 210B is successfully performed while a power failure at the primary storage node 2A may prevent complete performance of the data I/O 210A at the primary storage node 2A. Such a scenario can leave the distributed storage system 200 in a state of inconsistent data where the disk 4A of the primary storage node 2A contains data $_{DT-1}$ but the disk 4B at the secondary storage node 2B contains data $_{DT}$ 220B. This pathological condition of power failure at the primary storage node 2A may be mitigated using timestamping as described further herein.

Considering a third pathological scenario, a link failure between the primary storage node 2A and the secondary storage node 2B can prevent, entirely, the primary storage node 2A from issuing a synchronizing I/O 210B to the secondary storage node 2B. An existing power failure at the secondary storage node 2B can create the same complication. Such a scenario can leave the distributed storage system 200 in a state of inconsistent data where the disk 4A of the primary storage node 2A contains data $D_T$ 220B but the disk 4B at the secondary storage node 2B contains data $D_{T-1}$ since the synchronizing I/O 210B was never received by the secondary storage node 2B. This pathological condition of link failure between the primary storage node 2A and the secondary storage node 2B may be mitigated using timestamping as described further herein.

In an implementation, a global running number (referred to as a Global Time Segment number ($G_{TS}$) or "timestamp") representing a fixed time period is maintained in each replication server (i.e., in the primary node and the secondary node). A length of the Time Segment is set to a predetermined length of time, such as 20 minutes for example, although any predetermined or fixed length of time may be used depending on the implementation. The timestamp $G_{TS}$ may be initially set to any value depending on the implementation. For example, the timestamp $G_{TS}$ may be set to year 1985 in the primary node and the secondary node. At start of year 1985, its initial value will be zero; after that, for each 20 minute time period (or Time Segment length), the timestamp $G_{TS}$ value will be incremented by 1. Since both the primary node and the secondary node are set to same time zone and the timestamp $G_{TS}$ on each node starts from the same absolute point, the value between the two nodes will be the same at any given point.

In an implementation, the timestamp $G_{TS}$ is logged by a distributed volume manager ("DVM") module on its associated node whenever overwrites or a new write happens to a particular provision. Whenever a provision is allocated, the timestamp number is logged in the DVM for the corresponding territory. As an example, say for the current 20 minutes time interval (T1), the global number timestamp $G_{TS}$ is 2001. For the next 20 to 40 minutes time interval (T2), the global number timestamp $G_{TS}$ will be 2002 and so on.

T1→$G_{TS}$=2001
T2→$G_{TS}$=2002
. . .
Tn→$G_{TS}$=2001+n.

Each territory in a volume will have a territory time interval/segment number "ti_num" field. In an implementation, the territory time segment number is a 3 byte field that is part of the DVM territory metadata. Whenever a new provision is allocated or a block is modified, the DVM updates the ti_num with the timestamp $G_{TS}$. In this manner, the ti_num for a territory indicates the last modified or allocated time interval of a provision. Most of an application's writes tend to be locally and spatially; i.e., there is usually a burst of I/Os to small areas of the volume over a short period of time compared to other areas in the volume. Also, certain types of volume such as log volumes tend to be accessed sequentially. Thus, choosing to log the time interval at territory granularity (e.g., 8 MB) will ensure that a greater number of outstanding I/Os hit the same region. This avoids multiple logging of ti_num for a particular territory in a volume. During a write to a particular provision in a volume, before logging the ti_num, the DVM checks whether the existing ti_num of the territory is less than $G_{TS}$. Only if the ti_num is less than the running global time segment number, it is logged with the $G_{TS}$ in the DVM; i.e., if ti_num<$G_{TS}$, then ti_num=$G_{TS}$.

Figure 3:
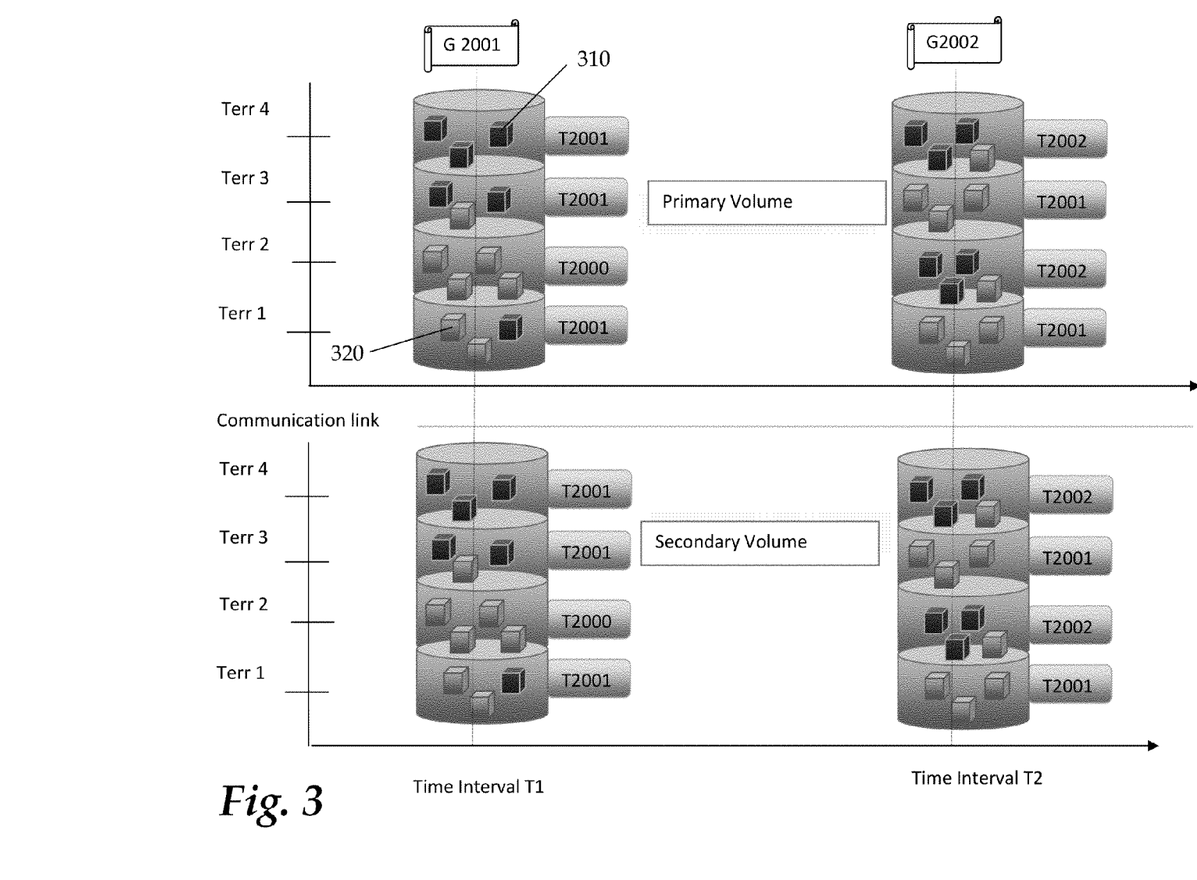
FIG. 3 is a diagram illustrating the volume state with the updated time segment number in both the primary and secondary nodes during each time interval according to one exemplary embodiment.

FIG. 3 represents the volume state with the updated time segment number in both the primary and secondary nodes during each time interval. The darker shaded blocks 310 throughout FIG. 3 represent newly/modified blocks in a territory ("Terr") and the lighter shaded blocks 320 throughout FIG. 3 represent the unmodified data during a particular time interval. Whenever a new write/modified write happens to a territory, the territory time segment number is updated with the global time segment number (timestamp) $G_{TS}$ in both the primary node and the secondary node. G2001 and G2002 represent the global time segment number $G_{TS}$ for time intervals T1 and T2, respectively. Similarly, T2001 and T2002 represent the updated territory time segment number ti_num for each territory at T1 and T2, respectively.

In synchronous replication, the secondary node (or secondary server) should always be in sync with the primary node (or primary server). When one of the servers is down or the link between them is lost, then replication gets affected. If the primary node is still accessible, then the application server will continue to perform I/Os. These I/Os must be acknowledged back by the primary node without replicating to the secondary node. Further, at the time of the communications breakdown, there might have been several I/Os in-flight which may or may not have been completed in the secondary node. Also, if the secondary node has gone down, there might be several I/Os which had been cached in the secondary node without being persisted to disk, some of which may have been acknowledged to the primary node. Later, when the communication is reestablished between the two nodes, these in-flight and cached I/Os need to be resynchronized between the two nodes.

Similarly, resynchronization is needed between the nodes after a failover and when the original primary node comes back up. In this case, resynchronization includes all the in-flight I/Os during the original primary node failure, which may or may not have completed in either of the nodes. It will include I/Os that were cached in the original primary node at the time of its failure, and it will include all I/Os that have been performed in the new primary node that are yet to be replicated to the new secondary node. As described herein, timestamp logic provides techniques to resynchronize the data for the above mentioned issues.

In order to recover from any failures in replication, the latest point in time is determined in which the disk image is consistent with respect to the applications. Since every newly written/modified data in a territory of a volume during a particular time interval is logged by DVM module in the primary node and the secondary node, resynchronization can be performed by determining failure time interval. Taking into consideration the in-flight I/Os and cached I/Os in both the nodes, it is better to choose a lesser time segment number than the failure time segment number (failure time segment number minus one). This means re-syncing twenty minutes of extra data in the worst case, for example. However, by determining the cause of failure, this re-synching of the twenty minutes of extra data can be handled efficiently. But considering the drawbacks of gating with respect to performance drop and also lesser frequency of failures that can happen in synchronous replication, re-syncing of this extra data is acceptable. This also solves the problem of the write-back cache issue. Determining a failure time interval number minus one as the resynchronization point takes care of the write-back issue and data consistency in disks in both the primary node and the secondary node. A factor in implementing this logic is determining the resynchronization point. Once the resynchronization point is determined, a replication module queries the DVM module for all I/Os that happened then and after the resynchronization point. This I/O is re-synced to the secondary node so that both the nodes are in consistent state.

Figure 4A:
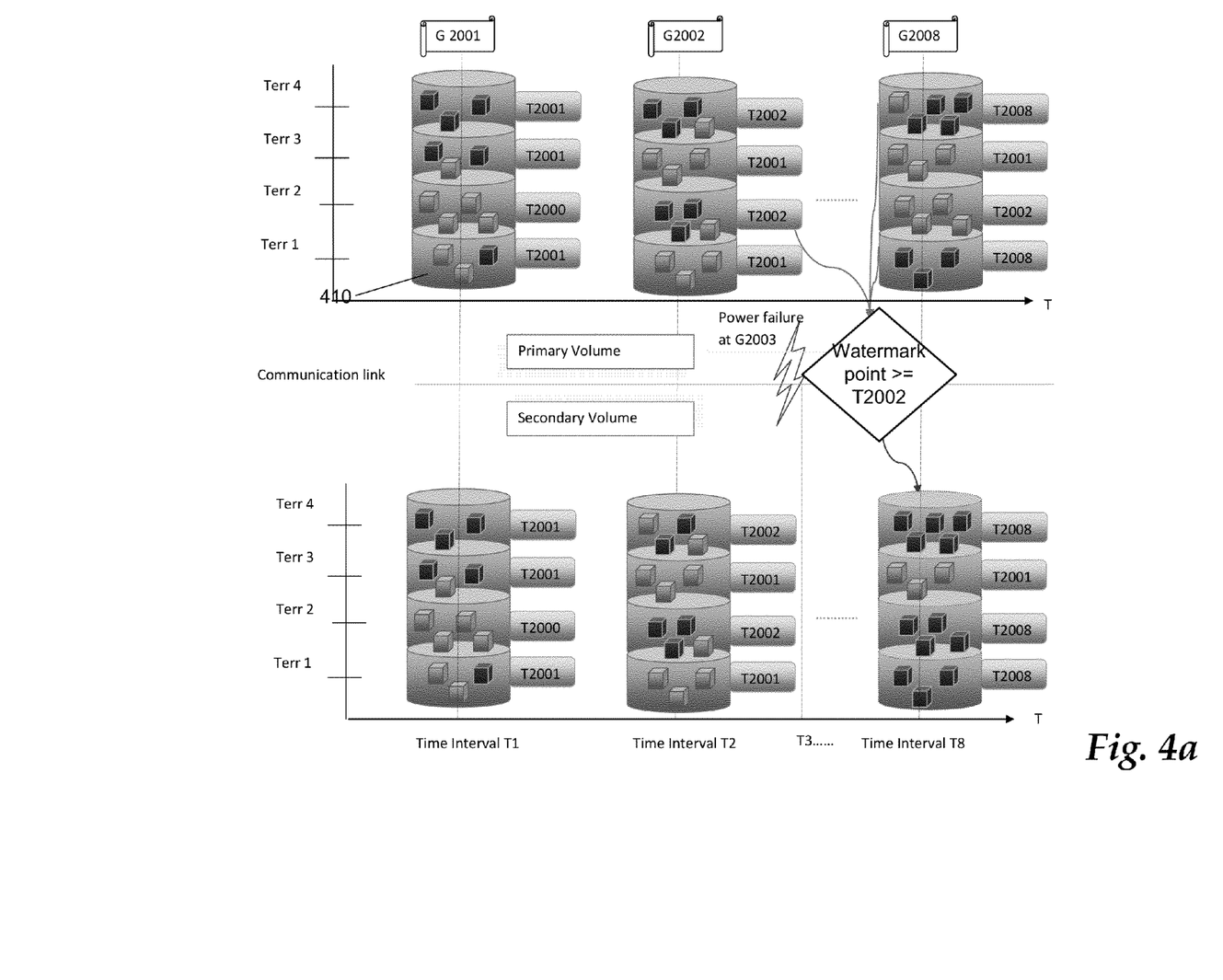
FIG. 4a is a diagram illustrating a re-synchronization scenario due to a temporary link failure.
Figure 4B:
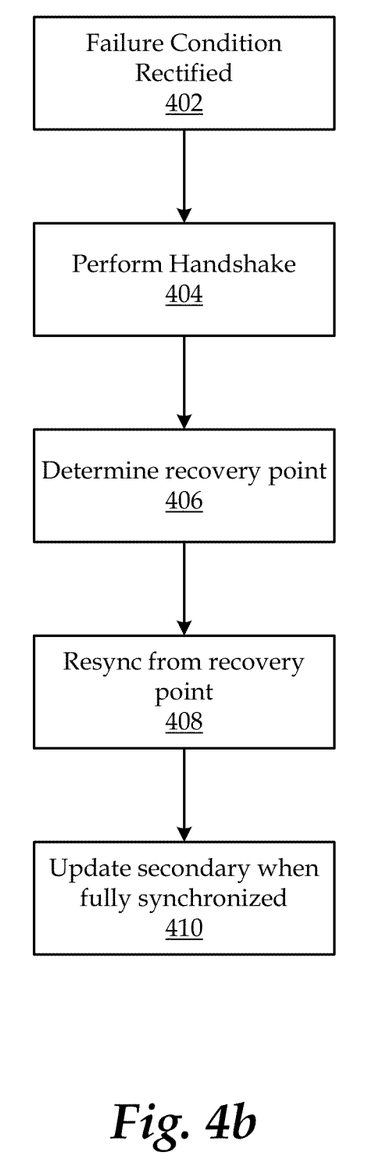

FIGS. 4a and 4b represents a resynchronization scenario due to a temporary link failure or temporary power failure. The territory time interval number is updated correctly with latest global time segment number for each of the new/modified I/Os. Each cylinder 410 represents a territory (Terr) in the disk. While replication was going on, a link or power failure occurred in the secondary during time interval T3.

When the link or power comes back at the secondary at a later point in time interval T8 (FIG. 4b; 402), the secondary volume has to be re-synced with the primary volume. The primary node handshakes with the secondary node (FIG. 4b; 404) to determine the resynchronization point (FIG. 4b; 406). The recovery point is marked as T2002. All the territories with territory number 22=2002 have to be re-synced to the secondary (FIG. 4b; 408). The replication modules queries the DVM module for all the territories with territory number 22=2002. So territory 2 at time interval number T2 and territory 1 and territory 4 at time interval T8 have to be re-synced to the secondary volume. Since territory 3 is untouched during intervals T2 to T8, there is no reason to sync that data.

The resynchronization scenario situation can be handled much more efficiently incase of temporary link failures between primary and secondary. Fewer amounts of data need to be resynchronized between the replication servers in case of link failures compared to power failures. The reason for the above is that the all the IOs replicated prior to the link failure will be completed in the secondary, thus negating the drawbacks of write back issue and data consistency in disks in both the primary and secondary servers. So in this case, the resynchronization point or the watermark point is same as the failure time interval number, thus saving extra twenty minutes of data to be resynchronized compared to be power failure scenario mentioned previously.

In case of temporary link failures, when the link comes back up later during the initial handshake the cause of failure is determined and the resynchronization point is determined as the failure time interval number. In FIG. 4a, link failed at time interval number T3 so the watermark point and the resynchronization point is determined as T2003. So when link comes back all the territories which is having territory number>=2003 has to re-synced to the secondary. So in link failure scenario territory 2 remains same whereas for a power failure scenario territory 2 also has to be re-synced and will be updated with T2008.

Link failures or power failures can still happen during the process of resynchronization. The secondary territory time segment number will be updated with its latest global time segment number before the whole data to the territory is fully re-synced from the primary. If a link fails at this time, it will result in inconsistent data in the mirror node when the link comes back again. Hence there is need of persisting the watermark point in the primary (recovery point time segment number) just before the start of resynchronization. Once the secondary server is in sync with the primary server, this watermark point can be cleared (FIG. 4b; 410).

This logic provides an advantage of re-syncing fewer amounts of data if a link failure happens during resynchronization. The resynchronization is ordered in such a way that territories with lesser time segment numbers are re-synced before the territories with the higher time segment numbers. The watermark point will be updated with the next higher territory segment number so that if a link fails and comes back up in between, the re-sync can be started from the last updated territory segment number.

This technique may be used for many to one replication situations (different volumes from different primary nodes to a same secondary node). It is noted that all the nodes part of the replication should have same time zone. This ensures that the global time interval number is consistent across all the nodes.

Thus, the timestamp logic provides a straightforward and efficient solution compared to the gating and tabbing logic in re-sync scenarios caused due to power failures or link failures in synchronous replication. It removes the additional overhead of an extra memory footprint and logging and maintaining the gate tables and bitmaps which results in a performance drop because of the write latency.

It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

Figure 5:
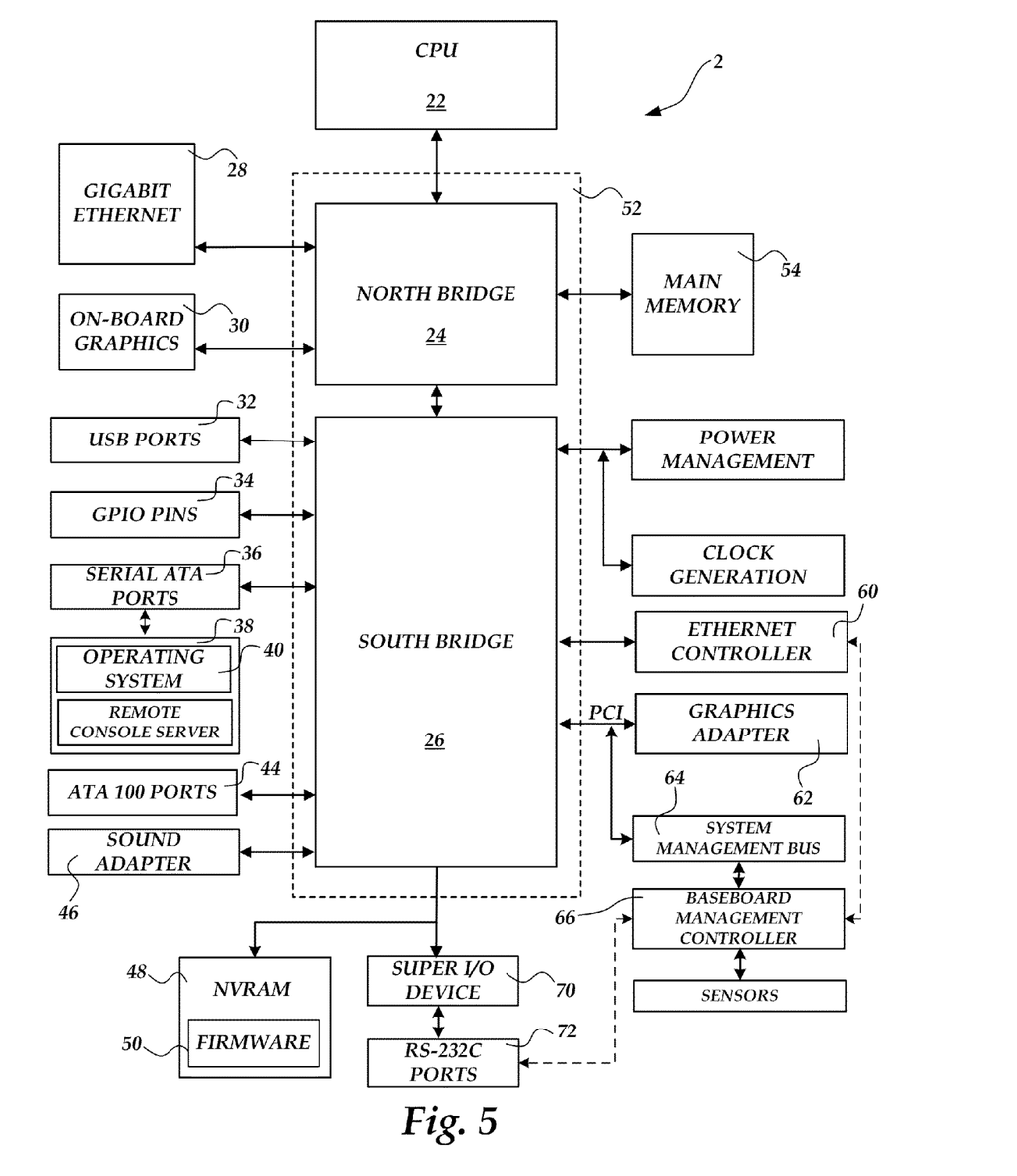
FIG. 5 is a computer architecture diagram illustrating a computer hardware architecture for a computing system capable of serving as a storage node according to one exemplary embodiment of the present invention.

FIG. 5 and the following discussion are intended to provide a brief, general description of a suitable computing environment in which the embodiments described herein may be implemented. While the technical details are presented herein in the general context of program modules that execute in conjunction with the execution of an operating system, those skilled in the art will recognize that the embodiments may also be implemented in combination with other program modules.

Generally, program modules include routines, programs, components, data structures, and other types of structures that perform particular tasks or implement particular abstract data types. Moreover, those skilled in the art will appreciate that the embodiments described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices.

In particular, FIG. 5 shows an illustrative computer architecture for a storage node computer 2 that may be utilized in the implementations described herein. The storage node computer 2 includes a baseboard, or "motherboard", which is a printed circuit board to which a multitude of components or devices may be connected by way of a system bus or other electrical communication paths. In one illustrative embodiment, a CPU 22 operates in conjunction with a chipset 52. The CPU 22 is a standard central processor that performs arithmetic and logical operations necessary for the operation of the computer. The storage node computer 2 may include a multitude of CPUs 22.

The chipset 52 includes a north bridge 24 and a south bridge 26. The north bridge 24 provides an interface between the CPU 22 and the remainder of the computer 2. The north bridge 24 also provides an interface to a random access memory ("RAM") used as the main memory 54 in the computer 2 and, possibly, to an on-board graphics adapter 30. The north bridge 24 may also include functionality for providing networking functionality through a gigabit Ethernet adapter 28. The gigabit Ethernet adapter 28 is capable of connecting the computer 2 to another computer via a network. Connections which may be made by the network adapter 28 may include LAN or WAN connections. LAN and WAN networking environments are commonplace in offices, enterprise-wide computer networks, intranets, and the internet. The north bridge 24 is connected to the south bridge 26.

The south bridge 26 is responsible for controlling many of the input/output functions of the computer 2. In particular, the south bridge 26 may provide one or more universal serial bus ("USB") ports 32, a sound adapter 46, an Ethernet controller 60, and one or more general purpose input/output ("GPIO") pins 34. The south bridge 26 may also provide a bus for interfacing peripheral card devices such as a graphics adapter 62. In one embodiment, the bus comprises a peripheral component interconnect ("PCI") bus. The south bridge 26 may also provide a system management bus 64 for use in managing the various components of the computer 2. Additional details regarding the operation of the system management bus 64 and its connected components are provided below.

The south bridge 26 is also operative to provide one or more interfaces for connecting mass storage devices to the computer 2. For instance, according to an embodiment, the south bridge 26 includes a serial advanced technology attachment ("SATA") adapter for providing one or more serial ATA ports 36 and an ATA 100 adapter for providing one or more ATA 100 ports 44. The serial ATA ports 36 and the ATA 100 ports 44 may be, in turn, connected to one or more mass storage devices storing an operating system 40 and application programs, such as the SATA disk drive 38. As known to those skilled in the art, an operating system 40 comprises a set of programs that control operations of a computer and allocation of resources. An application program is software that runs on top of the operating system software, or other runtime environment, and uses computer resources to perform application specific tasks desired by the user.

According to one embodiment of the invention, the operating system 40 comprises the LINUX operating system. According to another embodiment of the invention the operating system 40 comprises the WINDOWS SERVER operating system from MICROSOFT CORPORATION. According to another embodiment, the operating system 40 comprises the UNIX or SOLARIS operating system. It should be appreciated that other operating systems may also be utilized.

The mass storage devices connected to the south bridge 26, and their associated computer-readable media, provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed by the computer 2. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer.

A low pin count ("LPC") interface may also be provided by the south bridge 26 for connecting a "Super I/O" device 70. The Super I/O device 70 is responsible for providing a number of input/output ports, including a keyboard port, a mouse port, a serial interface 72, a parallel port, and other types of input/output ports. The LPC interface may also connect a computer storage media such as a ROM or a flash memory such as a NVRAM 48 for storing the firmware 50 that includes program code containing the basic routines that help to start up the computer 2 and to transfer information between elements within the computer 2.

As described briefly above, the south bridge 26 may include a system management bus 64. The system management bus 64 may include a baseboard management controller (BMC) 66. In general, the BMC 66 is a microcontroller that monitors operation of the computer system 2. In a more specific embodiment, the BMC 66 monitors health-related aspects associated with the computer system 2, such as, but not limited to, the temperature of one or more components of the computer system 2, speed of rotational components (e.g., spindle motor, CPU fan, etc.) within the system, the voltage across or applied to one or more components within the system 2, and the available or used capacity of memory devices within the system 2. To accomplish these monitoring functions, the BMC 66 is communicatively connected to one or more components by way of the management bus 64. In an embodiment, these components include sensor devices for measuring various operating and performance-related parameters within the computer system 2. The sensor devices may be either hardware or software based components configured or programmed to measure or detect one or more of the various operating and performance-related parameters. The BMC 66 functions as the master on the management bus 64 in most circumstances, but may also function as either a master or a slave in other circumstances. Each of the various components communicatively connected to the BMC 66 by way of the management bus 64 is addressed using a slave address. The management bus 64 is used by the BMC 66 to request and/or receive various operating and performance-related parameters from one or more components, which are also communicatively connected to the management bus 64.

It should be appreciated that the computer 2 may comprise other types of computing devices, including hand-held computers, embedded computer systems, personal digital assistants, and other types of computing devices known to those skilled in the art. It is also contemplated that the computer 2 may not include all of the components shown in FIG. 5, may include other components that are not explicitly shown in FIG. 5, or may utilize an architecture completely different than that shown in FIG. 5.

Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the invention.

The subject matter described above is provided by way of illustration only and should not be construed as limiting. Various modifications and changes may be made to the subject matter described herein without following the example embodiments and applications illustrated and described, and without departing from the true spirit and scope of the present invention.

What is claimed:

1. A method of using timestamps in a synchronous replication between a first volume and a second volume, comprising:
maintaining a global time segment number that is incremented in time;
logging a current global time segment number for each write to a provision with a territory within a redundant array of inexpensive disk (RAID) volume, the logging of the current global time segment number for each write being performed if a territory time segment number is less than the current global time segment number for each write being performed at a territory granularity;
determining a restoration of replication between the first volume and the second volume after a failure has been detected;
determining a last global time segment number where replication was successful and declaring the last global time segment as a watermark; and
restoring I/Os to the second volume from the first volume from that occurred since the watermark.

2. The method of claim 1, wherein the global time segment number has a fixed length.

3. The method of claim 1, wherein the logging is performed by a distributed volume manager (DVM) associated with the territory.

4. The method of claim 1, further comprising:
declaring the watermark at a time corresponding to the last global time segment minus 1; and
restoring I/Os to the second volume from the watermark.

5. The method of claim 1, further comprising clearing the watermark after all I/Os since the watermark have been successfully restored.

6. The method of claim 1, further comprising:
restoring a portion of the I/Os since the watermark by beginning a resynchronization with territories having a lowest time segment number;
updating the territories on the second volume;
incrementing a time segment number being restored; and
updating the watermark with the incremented time segment number after the second volume is updated.

7. The method of claim 1, wherein each global time segment represents 20 minutes.

8. The method of claim 1, logging the current global time segment number for each write further comprising writing the current global time segment to a 3-byte field in a DVM territory metadata.

9. A data storage system, comprising:
a storage server;
a physical storage device associated with storage server;
a processing unit associated with the storage server; and
one or more modules for execution on the processing unit, operable to maintain a global time segment number that is incremented in time, log a current global time segment number for each write to a provision with a territory within a redundant array of inexpensive disk (RAID) volume, determine a restoration of replication between a first volume and a second volume after a failure has been detected, determine a last global time segment number where replication was successful and declaring the last global time segment as a watermark, and restore I/Os to the second volume from the first volume from that occurred since the watermark,
wherein the current global time segment number for each write is logged if a territory time segment number is less than the current global time segment number for each write being performed at a territory granularity.

10. The data storage system of claim 9, wherein the global time segment number has a fixed length.

11. The data storage system of claim 9, further comprising a distributed volume manager (DVM) associated with the territory that performs the logging.

12. The data storage system of claim 9, wherein the watermark is declared at a time corresponding to the last global time segment minus 1, and wherein I/Os are restored to the second volume from the watermark.

13. The data storage system of claim 9, wherein the watermark is cleared after all I/Os since the watermark have been successfully restored.

14. The data storage system of claim 9, wherein a portion of the I/Os are restored since the watermark by beginning a resynchronization with territories having a lowest time segment number, wherein the territories are updated on the second volume, wherein a time segment number being restored is incremented, an wherein the watermark is updated with the incremented time segment number after the second volume is updated.

15. A computer storage medium having computer-executable instructions stored thereon which, when executed by a computer system, cause the computer system to:
maintain a global time segment number that is incremented in time;
log a current global time segment number for each write to a provision with a territory within a redundant array of inexpensive disk (RAID) volume;
determine a restoration of replication between a first volume and a second volume after a failure has been detected;
determine a last global time segment number where replication was successful and declaring the last global time segment as a watermark; and
restore I/Os to the second volume from the first volume from that occurred since the watermark,
wherein the current global time segment number for each write is logged if a territory time segment number is less than the current global time segment number for each write being performed at a territory granularity.

16. The computer storage medium of claim 15, wherein the global time segment number has a fixed length.

17. The computer storage medium of claim 15, wherein the logging is performed by a distributed volume manager (DVM) associated with the territory.

18. The computer storage medium of claim 15, further comprising instructions to:
declare the watermark at a time corresponding to the last global time segment minus 1; and
restore I/Os to the second volume from the watermark.

19. The computer storage medium of claim 15, further comprising instructions to clear the watermark after all I/Os since the watermark have been successfully restored.

20. The computer storage medium of claim 15, further comprising instructions to:
restore a portion of the I/Os since the watermark by beginning a resynchronization with territories having a lowest time segment number;
update the territories on the second volume;
increment a time segment number being restored; and update the watermark with the incremented time segment number after the second volume is updated.

* * * * *